United States Patent [19]

Hess et al.

[11] Patent Number: 4,620,354
[45] Date of Patent: Nov. 4, 1986

[54] METHOD OF APPLYING WEATHERSTRIP TO A VEHICLE BODY OPENING

[75] Inventors: Edward C. Hess, Farmington Hills; Charles J. Anglewicz, Romeo, both of Mich.

[73] Assignee: General Motors Corporation, Detroit, Mich.

[21] Appl. No.: 737,931

[22] Filed: May 28, 1985

[51] Int. Cl.$^4$ .............. B23P 17/00; B23P 21/00; E06B 7/16

[52] U.S. Cl. ............................ 29/417; 29/701; 49/490

[58] Field of Search .......... 49/490, 498; 901/41; 29/417, 700, 701; 414/744 A

[56] References Cited

U.S. PATENT DOCUMENTS

| | | | |
|---|---|---|---|
| 4,067,146 | 1/1978 | Mesnel et al. | 49/490 |
| 4,178,632 | 12/1979 | Anthony | 901/41 |
| 4,263,750 | 4/1981 | Hein | 49/490 |
| 4,273,506 | 6/1981 | Thomson et al. | 414/744 A |
| 4,348,443 | 7/1982 | Hein | 49/490 |
| 4,411,941 | 10/1983 | Azzola | 49/490 |

Primary Examiner—Howard N. Goldberg
Assistant Examiner—Steven Nichols
Attorney, Agent, or Firm—R. L. Phillips

[57] ABSTRACT

A method of using a robot to apply a weatherstrip to a flange extending about an opening in a vehicle body wherein the weatherstrip is coiled on an end effector which in turn unwinds and rolls the weatherstrip onto the flange starting from a predetermined starting position on the flange to a stop position a predetermined distance short of the starting position.

The unwound weatherstrip is lifted away from the flange at the stop position and then held and cut-off at a point determined by the above-mentioned predetermined distance so that the weatherstrip being applied to the flange will then abut end-to-end whereafter the cut end of the weatherstrip is retrieved and applied to the flange.

2 Claims, 5 Drawing Figures

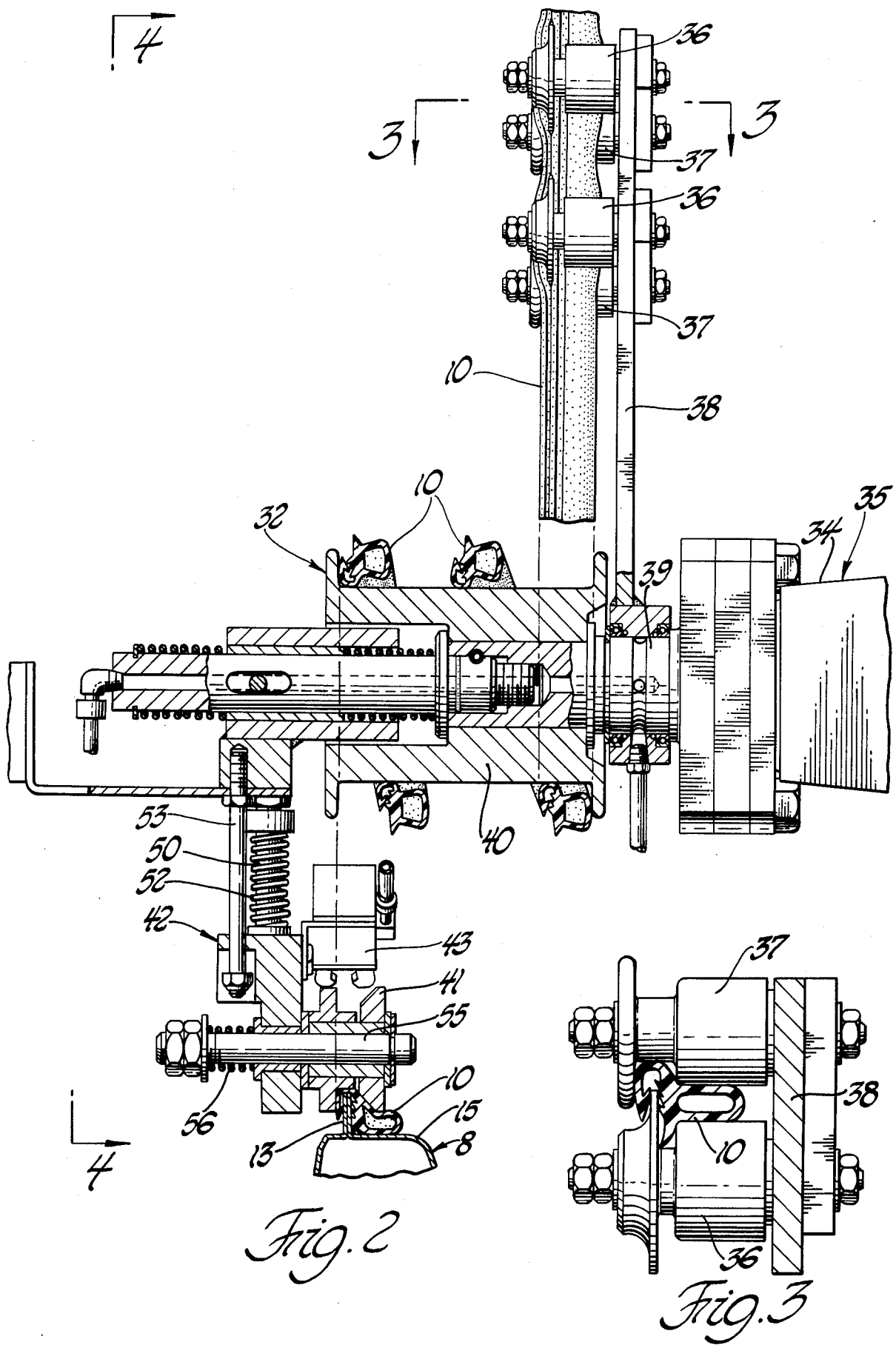

METHOD OF APPLYING WEATHERSTRIP TO A VEHICLE BODY OPENING

TECHNICAL FIELD

This invention relates to a method of applying weatherstrip to a vehicle body opening and more particularly to a method of using a robot to apply weatherstrip to the flange extending about the door, trunk and hood openings of a vehicle body.

BACKGROUND OF THE INVENTION

In the assembly of a vehicle body, it has been common practice to manually apply weatherstrip to the flange extending about the door, trunk and hood openings of the vehicle body. Typically, the weatherstrips are either precut to length or cut to length from a roll at application and in either event there is significant labor time and with varying degrees of quality of application.

SUMMARY OF THE INVENTION

The present invention is directed to automating the application of the weatherstrips with a method of using a robot to apply same in what has been found to be a very efficient manner. In accordance with the present invention, the robot first coils the weatherstrip on an end effector thereon and then the robot is caused to track the flange therearound with the end effector while unwinding and unrolling the weatherstrip thereon. The end effector applies the weatherstrip starting from a predetermined start position on the flange and proceeds to a stop position that is a predetermined distance short of the starting position. The robot is then caused to lift the unwound weatherstrip away from the flange with the end effector at the stop position. The lifted weatherstrip is then grasped and held at the stop position and cut off at a point determined by the predetermined distance so that the weatherstrip applied to the flange will then abut end-to-end. The robot is thereafter caused to retrieve the cut end of the weatherstrip with the end effector and apply same to the flange and then press across the weatherstrip joint. The weatherstrip is thus applied in short time and with consistent end-to-end abutting thereof all with assured quality.

These and other objects, features and advantages of the present invention will be more apparent from the following description and drawings in which:

DESCRIPTION OF THE DRAWINGS

FIG. 2 is an enlarged view partially in section of the end effector on the robot in FIG. 1.

FIG. 3 is an enlarged sectional view of the end effector taken along line 3—3 in FIG. 2.

DETAILED DESCRIPTION OF THE PREFERRED EMBODIMENT

Figure 1:
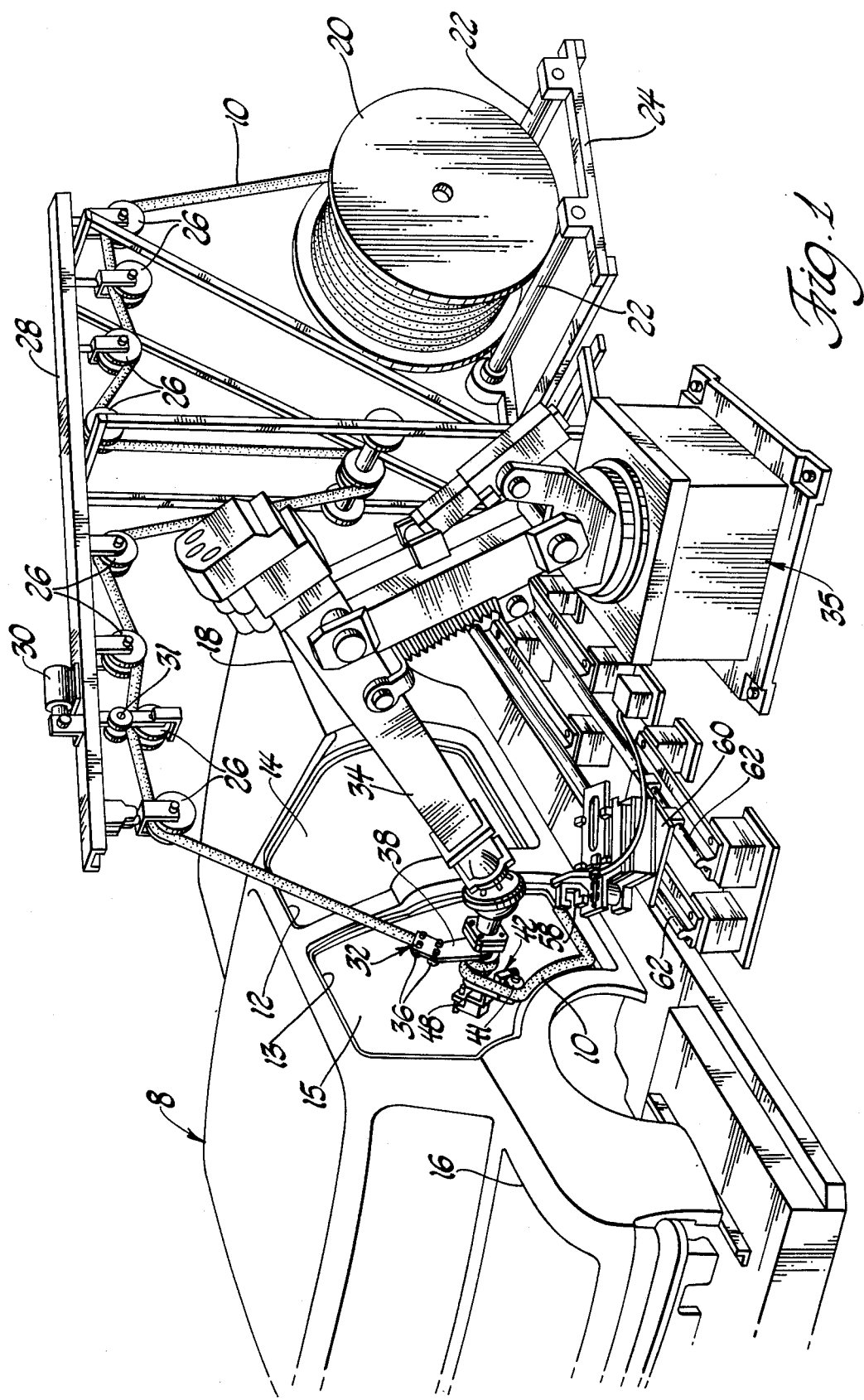
FIG. 1 is a perspective view of apparatus for carrying out the method of the present invention.

Referring to FIG. 1, there is shown a vehicle body generally designated as 8 undergoing factory assembly. This assembly includes the application of a weatherstrip 10 to a so-called pinch weld flange 12 and 13 extending about the front and rear door openings 14 and 15 respectively and also to those flanges (not shown) extending about the trunk opening 16 and hood opening 18. In the description that follows of the method and apparatus for applying the weatherstrip to the rear door opening, it will be understood that the same applies to these other openings with only their configuration changing and accordingly, the programming and positioning of the robot and attendant apparatus.

Figure 5:
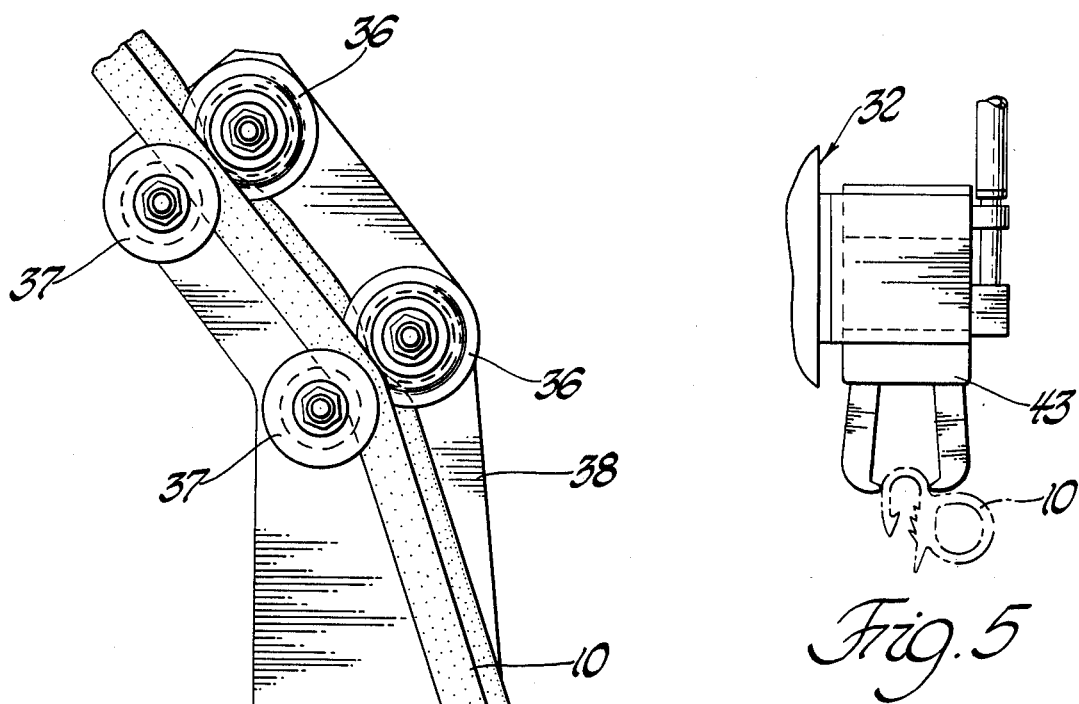
FIG. 5 is a side view of the hand on the end effector taken along the line 5—5 in FIG. 4.
Figure 4:
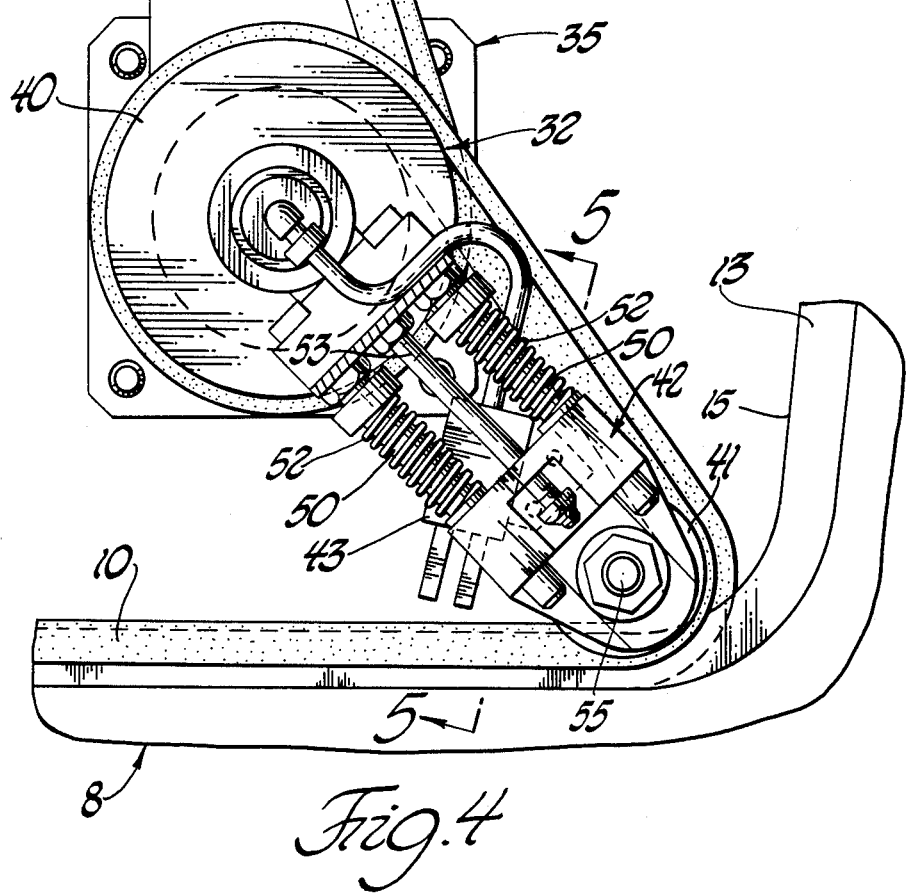
FIG. 4 is an end view of the end effector taken along the line 4—4 in FIG. 2.

The weatherstrip is supplied coiled on a spool 20 which is supported for rotation on a pair of rollers 22 mounted on a platform 24. The weatherstrip is threaded through a series of pulleys 26 mounted overhead on a hangar 28 with the speed of the weatherstrip controlled by a feed motor 30 and roller 31 combined with one of the pulleys 26 as shown. The weatherstrip is fed to an end effector generally identified as 32 which is mounted on the arm 34 of an otherwise conventional floor mounted robot 35. The weatherstrip is threaded through a set of form conditioning rollers 36 and 37 which are mounted on a feed member 38 that is swingingly supported on a spindle 39 of the end effector as seen in FIGS. 1–3. The weatherstrip passes several times around a spool 40 journaled on the spindle 39 and is then threaded around a positioning roller guide 41 mounted on a floating roller assembly 42 that is supported on the end of the end effector spindle 39. The weatherstrip passes around the roller guide 41 and through a hand gripper 43 which is operable to hold the weatherstrip in proper work position (see FIGS. 1, 4 and 5).

With the weatherstrip thus fed and held, the application thereof to the flange 13 of the door opening 15 is then ready to begin. To this end, the robot is programmed so as to take the end effector 32 from a vertical home position, place it in a horizontal work position and move it forward into the door opening at a start position a predetermined distance (e.g. 13 inches) back from the front of the door opening. The in-out and up-down location of the end effector 32 is accomplished by the use of a tactical sensor 48 mounted thereon. As the end effector moves into the door opening, the sensor 48 finds the location of the flange 13 and signals the robot when the end effector is in the proper location. The robot now lifts the end effector and rotates it until the roller guide 41 on the floating roller assembly 42 is set toward the bottom of the door opening. The roller guide 41 is mounted on a pair of guide bars 50 and loaded by springs 52 about these bars to obtain a vertical floating action limited by a stop bar 53 and is also mounted on a rotary shaft 55 and loaded by a spring 56 about this shaft to obtain a horizontal floating action. This in-out, up-down floating action allows the roller guide 41 to follow possible contour deviations or variations in the retaining flange around the door opening.

Describing then further the method, the robot is programmed to lower the end effector with the weatherstrip backed by the floating roller guide 41 until the weatherstrip is pressed onto the flange 13 and the vertical float action is compressed slightly (e.g. one-quarter inch) at which time the gripper 43 is deactivated releasing the weatherstrip. The robot is then programmed to move toward the rear of the door opening with the roller guide rotating counterclockwise as viewed in FIG. 1 (clockwise in FIG. 4) and pressing the weatherstrip firmly into place on the retaining flange. The robot rotates the end effector in a clockwise motion as viewed in FIG. 1 (counterclockwise in FIG. 4) as it follows the contour of the door opening keeping the roller guide perpendicular to the flange at all times. When the end effector reaches its final position, which is predetermined to be a certain distance short of the stop position (e.g. six inches) the end effector is lifted and rotated 90° by the robot whereupon the gripper 43 is then activated to grip the weatherstrip and hold it in a position for cut off by a cut-off device 58 mounted on a trolley 60. The trolley is guided alongside the vehicle body on a track 62 for movement of the cut-off device between a rear door cut-off station as shown in FIG. 1 and a similar station at the front door. In addition, the cut-off device is slide mounted on the trolley for extension to a body adjacent cut-off position and retraction therefrom to the position shown in FIG. 1. When in their proper relative positions, the cut-off device 58 is activated to sever the weatherstrip at the appropriate length for an end-to-end match on the flange in the door opening. Sealer is then added to the remaining cut off end of the weatherstrip and this process is accomplished by using either the cut-off device 58 to apply the sealer or indexing an applicator (not shown) into place. With the cut-off having been achieved, the robot rotates the end effector approximately 45° until the roller guide 41 of the end effector is perpendicular to the flange again. The robot is then programmed to move toward the front of the door opening a substantial distance past the cut off (e.g. six inches). The robot then lowers the end effector pressing the cut-off end of the weatherstrip against the flange with the roller guide 41 and moves toward the rear of the door opening pressing the remaining weatherstrip into place until it reaches the cut-off and then proceeds beyond a substantial distance (e.g. six inches) to thereby assure proper application on both sides of the cut-off or joint. The robot is then programmed to return to the cut-off device and with the hand 43 retrieve the end of the weatherstrip that the cut-off device has been holding whereafter the cut-off device is retracted.

The application of the weatherstrip to the retainer flange around the door opening is then complete and the robot is thereafter programmed to lift the end effector and rotate it to its start position and returned it to its home position.

Having thus described the method of the present invention as applied in installing the weatherstrip to the rear door opening, it will be understood that such method is likewise applicable to the front door opening and also both the trunk and hood openings of the vehicle body given the proper program for the robot to trace the flange contour of such openings and relocation of the cut-off device or the addition of further such devices for the trunk and hood openings. Furthermore, it will be appreciated by those skilled in the art that other forms of apparatus may be utilized for practicing the method of invention as defined within the scope of the appended claims.

The embodiments of the invention in which an exclusive property or privilege is claimed are defined as follows:

1. A method of using a robot to apply a weatherstrip to a flange extending about an opening in a vehicle body such as a door, trunk or hood opening comprising the steps of:
   having the robot coil the weatherstrip on an end effector thereon,
   having the robot track the flange therearound with the end effector while unwinding and rolling the weatherstrip thereon starting from a predetermined starting position on the flange to a stop position a predetermined distance short of the starting position,
   having the robot lift the unwound weatherstrip away from the flange with the end effector at the stop position,
   grasping and holding the lifted weatherstrip at the stop position,
   cutting-off the held weatherstrip at a point determined by said predetermined distance so that the weatherstrip being applied to the flange will then abut end-to-end, and
   having the robot retrieve the cut end of the weatherstrip with the end effector and apply same to the flange.

2. A method of using a robot to apply a weatherstrip to a flange extending about an opening in a vehicle body such as a door, trunk or hood opening comprising the steps of:
   having the robot coil the weatherstrip on an end effector thereon,
   having the robot track the flange therearound with the end effector while unwinding and rolling the weatherstrip thereon starting from a predetermined starting position on the flange to a stop position a predetermined distance short of the starting position,
   having the robot lift the unwound weatherstrip away from the flange with the end effector at the stop position,
   grasping and holding the lifted weatherstrip at the stop position,
   cutting-off the held weatherstrip at a point determined by said predetermined distance so that the weatherstrip being applied to the flange will then abut end-to-end,
   having the robot retrieve the cut end of the weatherstrip with the end effector and apply same to the flange, and
   having the robot press and roll the weatherstrip across its abutting end with the end effector.

* * * * *